United States Patent [19]

Stork et al.

[11] Patent Number: 5,781,914
[45] Date of Patent: Jul. 14, 1998

[54] CONVERTING DOCUMENTS, WITH LINKS TO OTHER ELECTRONIC INFORMATION, BETWEEN HARDCOPY AND ELECTRONIC FORMATS

[75] Inventors: David G. Stork, Stanford; K. Venkatesh Prasad, Cupertino, both of Calif.

[73] Assignees: Ricoh Company, Ltd., Tokyo, Japan; Ricoh Corporation, Menlo Park, Calif.

[21] Appl. No.: 497,985

[22] Filed: Jun. 30, 1995

[51] Int. Cl.[6] ................................................. G06F 17/40
[52] U.S. Cl. ........................... 707/506; 707/501; 707/513
[58] Field of Search .................................. 395/761, 762, 395/774; 382/175; 358/403; 707/501, 505–508, 513–516, 524, 530

[56] References Cited

U.S. PATENT DOCUMENTS

| 5,113,445 | 5/1992 | Wang ............................................. 380/51 |
| 5,317,646 | 5/1994 | Sang, Jr. et al. ............................. 707/506 |
| 5,333,237 | 7/1994 | Stefanopolis et al. ..................... 707/501 |
| 5,337,362 | 8/1994 | Gormish et al. ............................. 380/54 |
| 5,367,621 | 11/1994 | Cohen et al. ............................... 707/501 |
| 5,486,686 | 1/1996 | Zdybel, Jr. et al. ................... 307/541 X |
| 5,557,722 | 9/1996 | DeRose et al. ............................. 707/513 |

OTHER PUBLICATIONS

Myka et al., Using Electronic Facsimile of Documents for Automatic Reconstruction of Underlying Hypertext Structures, Document Analysis, pp. 528–532, Oct. 20, 1993.

Iizawa et al., Avital, A Private Teaching System by FAX Communication, Systems Integration 2nd Intl Conf., pp. 293–301, Jun. 15, 1992.

*Primary Examiner*—Anton Fetting
*Attorney, Agent, or Firm*—Blakely, Sokoloff, Taylor & Zafman

[57] ABSTRACT

A conversion method and apparatus that allows for converting a hardcopy document into a hyperdocument and vice versa. During hardcopy to hyperdocument conversion, hypertext information stored on the hardcopy document is used to set up links to other documents. During hyperdocument to hardcopy document conversion, hypertext link information is encoded and stored on the hardcopy document.

23 Claims, 10 Drawing Sheets

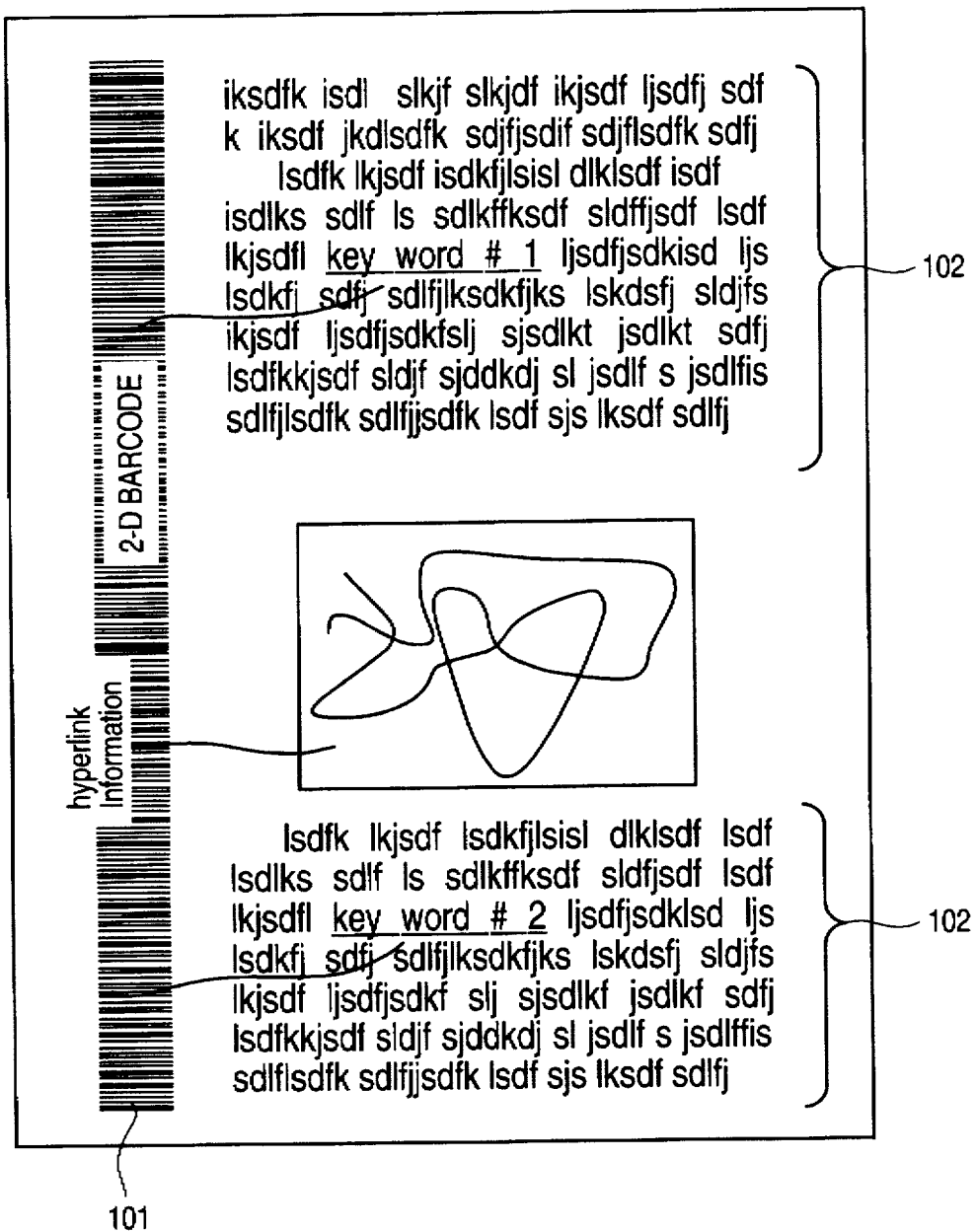
FIG_1

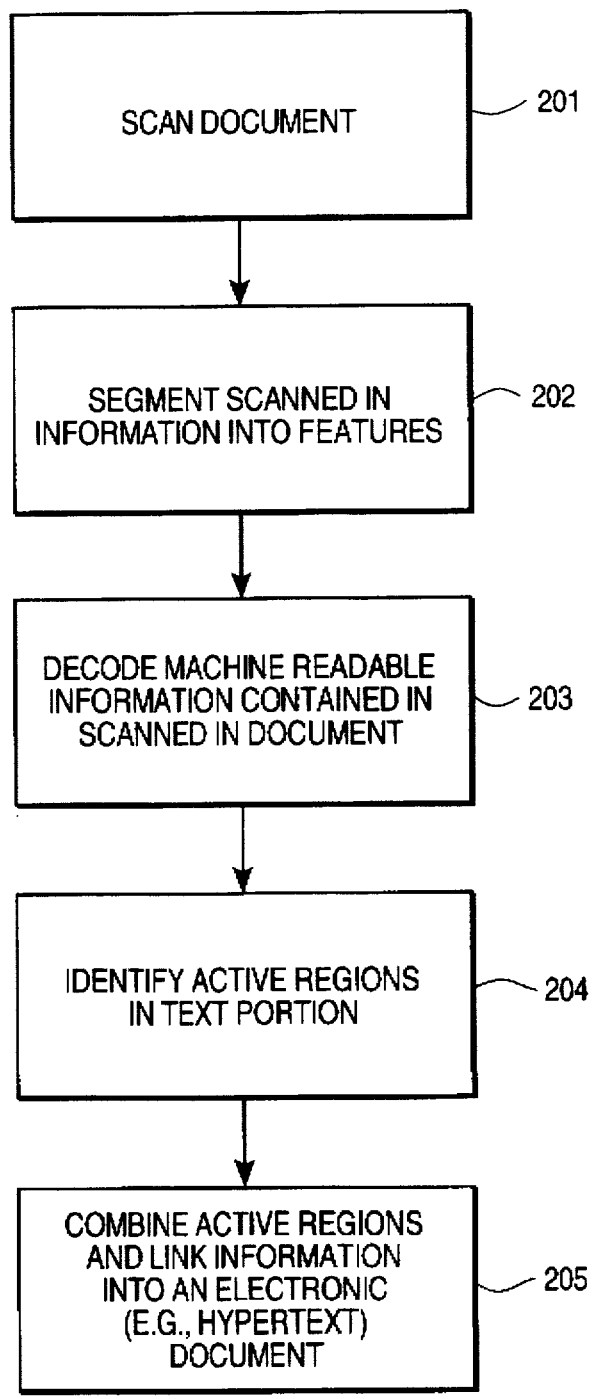
FIG_2

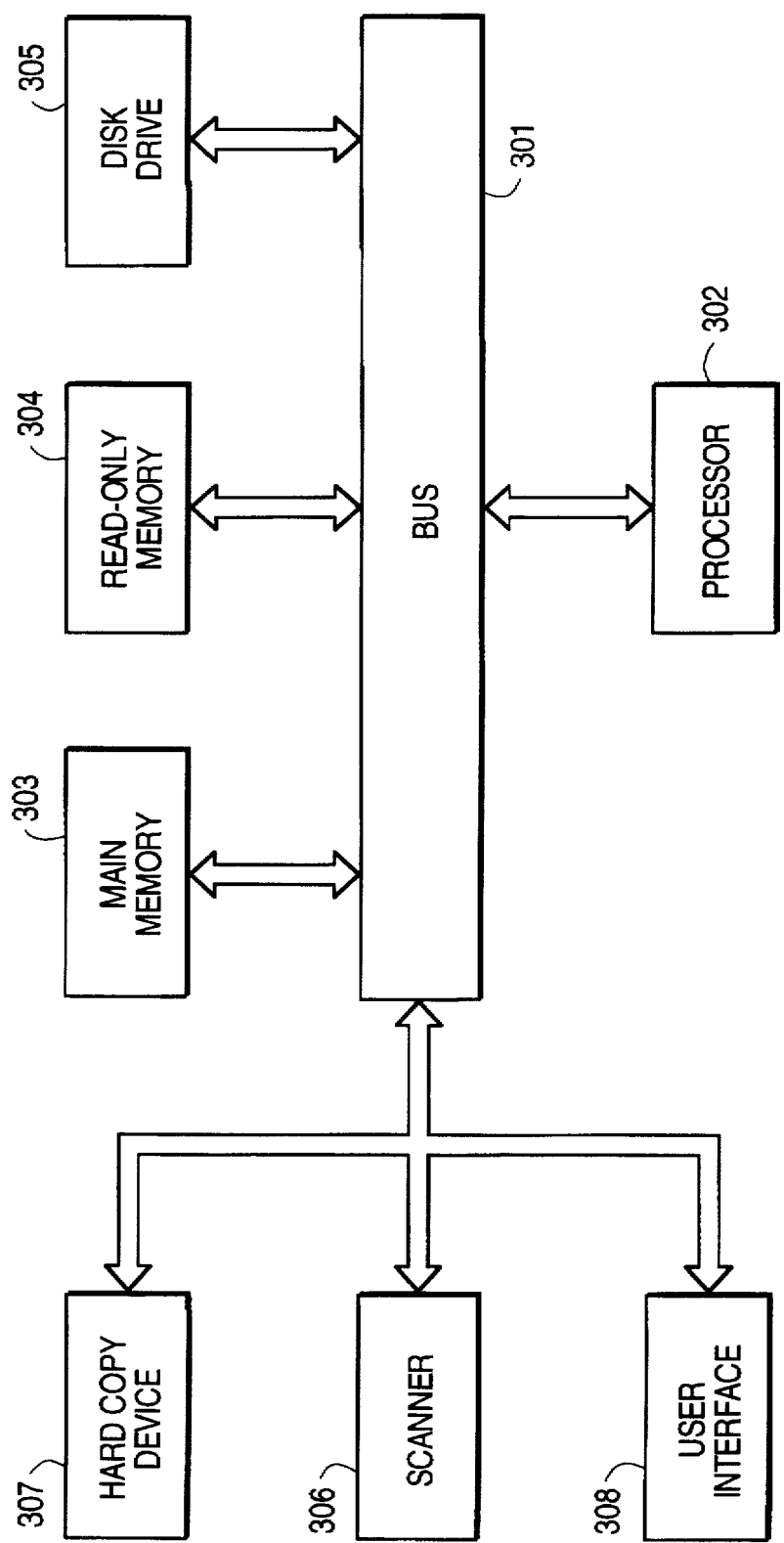
FIG_3

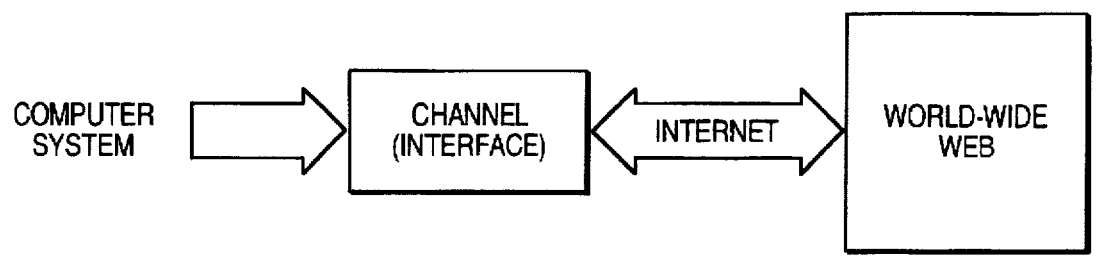
FIG_4

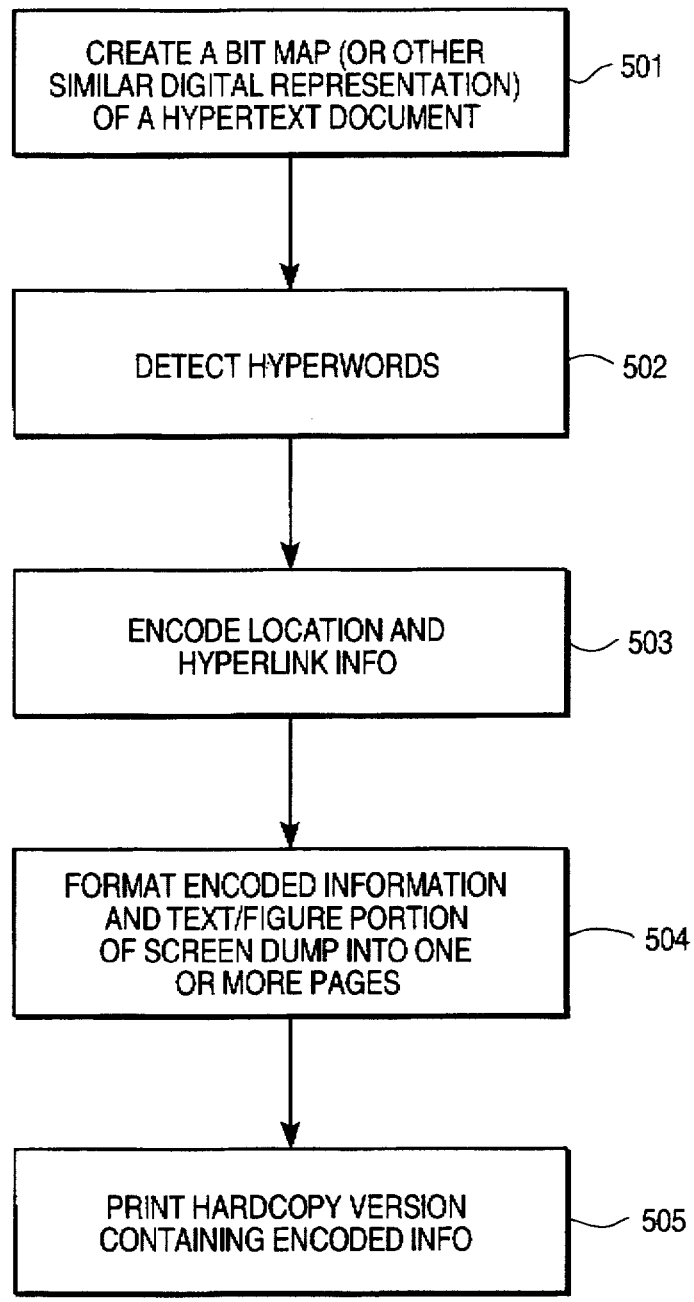
FIG_5

The RICOH California Research Center

The Art of Imagination                                    The Science of Information (This document is still under construction. Links may be broken at the moment. CRC members please try using our Internal server)

Welcome to CRC

At the California Research Center, we are concerned with the science of information. We work throughout the R&D spectrum, from basic science througfh applied research to advanced prototyping.

The California Research Center was formally established in 1989. Our history, charter, location and other background information can be found by clicking here.

CRC Publications

FIG_6A

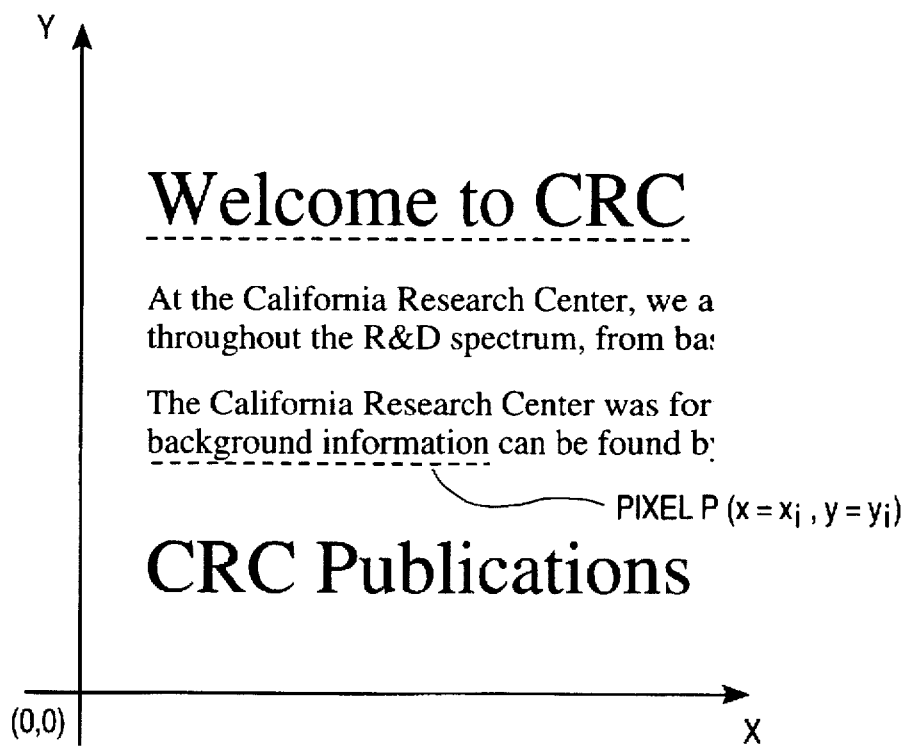
FIG_6B

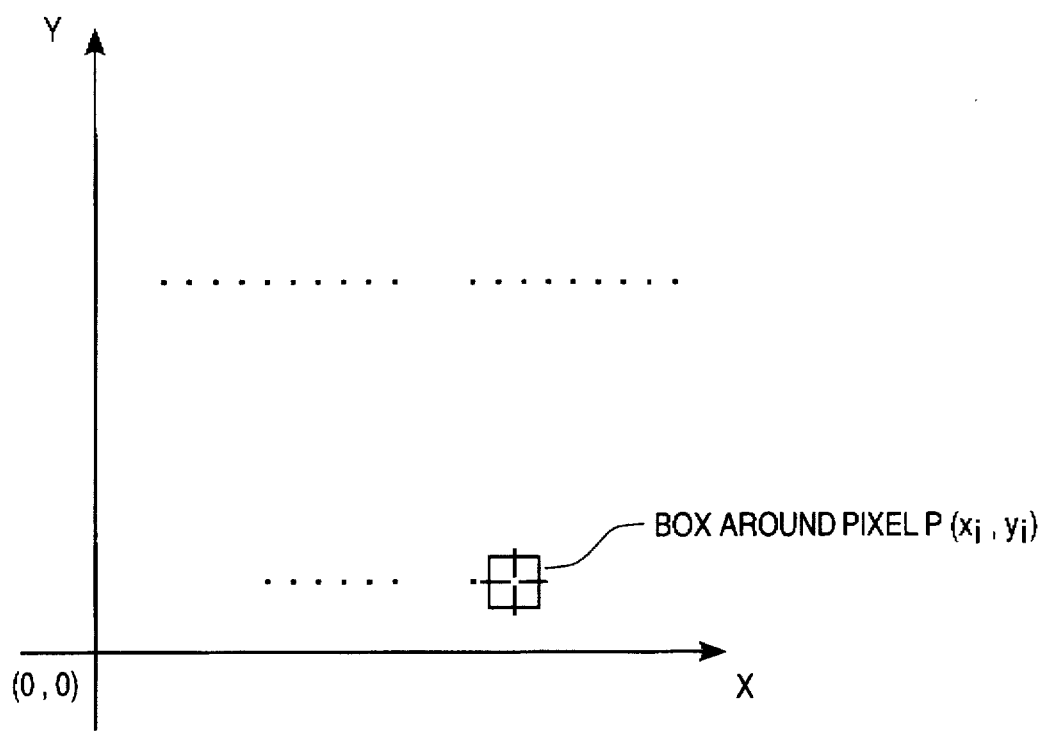
FIG_6C

FIG_6D

|  | 138 | 139 | 140 |
|---|---|---|---|
| 77 | 82 | 83 | 83 |
| 76 | 114 | 120 | 114 |
| 75 | 96 | 96 | 96 |

FIG_6E

CONVERTING DOCUMENTS, WITH LINKS TO OTHER ELECTRONIC INFORMATION, BETWEEN HARDCOPY AND ELECTRONIC FORMATS

FIELD OF THE INVENTION

The present invention relates to the field of document conversion and publication; more particularly, the present invention relates to hardcopy document to hyperdocument conversion that permits the construction of a hyperdocument complete with links from a hardcopy version of the document, and vice versa.

BACKGROUND OF THE INVENTION

The "World Wide Web" (hereinafter referred to as "the Web") is a term that describes the interconnected, on-line documents that can be accessed via computer systems hooked to the Internet using software clients. In the prior art, these software clients are graphical browsers, such as Mosaic and Netscape, that permit a user to select various documents. Upon selection, a graphical browser retrieves the documents and provides them to the user, either by displaying them on a display screen or by causing them to be printed on a hardcopy device, such as a printer, or in case where the linked document is an audio file or a movie file, the browser enables appropriate vendition.

Portions of documents displayed using the graphical browser contain hypertext links. The hypertext links link graphics or text on one document with another document on the Web. Documents containing hypertext links are created prior to their "publishing" on the Web. That is, a document that is to be published is provided to a server which creates the document and, essentially, publishes the document by permitting its access by others on the Web. Each hypertext link is associated with a Uniform Resource Locator (URL) that identifies and locates a document on the Web. When a user selects a hypertext link, using, for instance, a cursor, the graphical browser retrieves the corresponding (or linked) document(s).

In order to create documents containing a hypertext link, an individual must specify the specific portion, or active region, of the document that will be responsive to selection by the user. An individual also must identify the specific hypertext link information, including the URL, to set forth the resource or document that is to be located on the Web when the particular active region is selected by the user. Once both the active portions of the document and their corresponding hypertext links have been selected, an application, such as Mosaic, processes the information and produces the document. Note that such a process is not automatic and requires user interaction in order to specify these specific locations and hypertext links. It is desirable to automate such a process to allow the user to create a document having hypertext links without interactively specifying both active regions and their links. That is, it is desirable to have a passive hyperdocument creation system in which hypertext documents may be created automatically.

If a user desires to print a hypertext document, a hardcopy of the displayed document may be printed. However, the printed version does not contain the hypertext information. That is, the link information associated with the document is lost. Furthermore, because the link information is lost, it is impossible to use the printed copy of the document to recreate the hypertext document. If one desires to recreate the hypertext document, the user must again specify both active regions and their link information. It is desirable to automate the process to allow a hypertext document to be printed out and then, using that printout, recreate a hypertext document without having to actively interact in the set up of the hypertext document.

The present invention provides for conversion between hardcopy (e.g., plain text) and hypertext documents. In the present invention, this conversion is performed automatically. Furthermore, the present invention allows a hardcopy version of the hypertext document to be created, such that the link information remains with the hardcopy version. In this manner, the hardcopy document may be used to recreate a hypertext version of the document with the correct, or same, link information.

SUMMARY OF THE INVENTION

The present invention provides a method and apparatus for generating electronic documents from a hardcopy document, and vice versa. A hardcopy document contains encoded link information and one or more regions designated to be active that are associated with the encoding link information. The hardcopy document is scanned and the scanned information is converted into an electronic version of the hardcopy document having active regions. Each active region is linked to electronic information, such that selection of an active region accesses linked electronic information.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates an example of a hardcopy document containing encoded link information.

FIG. 2 is a flow diagram of one embodiment of the hardcopy to hypertext document conversion process of the present invention.

FIG. 3 is a block diagram of an exemplary computer system that may be employed by the present invention to convert hardcopy versions of documents to electronic versions of documents and vice versa.

FIG. 4 is one embodiment of World Wide Web document retrieval and publishing system of the present invention.

FIG. 5 is a flow diagram of one embodiment of the hypertext version to hardcopy version conversion process of the present invention.

FIG. 6A is an image of a sample hypertext document.

FIG. 6B is a magnified portion of the hypertext represented in FIG. 6A.

FIG. 6C illustrates the hyperwords being detected through the use of a template.

FIG. 6D is a magnified view of one embodiment of a template for locating the hyperwords in a hypertext document.

FIG. 6E illustrates a set of correlation values that result from applying the template of FIG. 6D throughout the hypertext document at the boxed region as shown in FIG. 6C.

DETAILED DESCRIPTION OF THE PRESENT INVENTION

A method and apparatus for converting between a hypertext and plain text document is described. In the following detailed description of the present invention numerous specific details are set forth, such as number of pages of documents, types of encoding, numbers of links, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the Present Invention

The present invention provides for converting a hardcopy version of a document containing, for instance, text and/or graphical features such as figures, into an electronic version of the document. In one embodiment, a paper document is converted into an electronic document and vice versa.

One application of the present invention is to convert paper documents into hypertext document. The paper document includes hypertext words and graphical features as well as encoded link information. By decoding the encoded link information and determining the location of active or "clickable" regions in the document, an electronic version of the document may be created.

For example, in the present invention, the user may take a hardcopy document containing, for example, ten pages of multi-column text, tables, and graphics containing "highlighted words", in-text references and a sidechannel of encoded information. The "highlighted" portions symbolize active regions that are designated to be active in the document. The user scans these pages into a document conversion system to form a full electronic hypertext version of the document automatically, having "clickable" links within the document that may link to other portions of the document as well as to a data base of documents, possibly via Mosaic.

The present invention also provides for printing a full electronic (e.g., hypertext) version of a document that is in a system into one or more pages of a hardcopy document such as paper, film, or other similar medium containing text, tables, highlighted words and graphical features, in-text references and a sidechannel of encoded information. This printed document then may be inserted into the document conversion system of the present invention to recreate the electronic (e.g., hypertext) version of the document. Thus, an electronic version of a document on a computer system may be printed to create a hardcopy version, complete with encoded information to enable the recreation of the electronic version.

Plain Text to Hypertext Conversion Process

The plain text to hypertext conversion process of the present invention is performed on a hardcopy (e.g., paper document). An exemplary paper page of the document is shown in FIG. 1. Referring to FIG. 1, the page is shown with text 102 on the right side containing text, key words, and graphical features such as figures. A section of encoded data 101 on the hardcopy document contains information associated with the key words, figures, etc. and their hyperlinks. In other words, the encoded information 101 contains hyperlink information that is used in the document to actively retrieve other portions of the document or other documents.

In one embodiment, the encoded information 101 comprises machine readable information. The machine readable information may be a digital format, such as a barcode or digital paper, one embodiment of which is described in U.S. Pat. No. 5,337,362, entitled "Method and Apparatus for Placing Data Onto Plain Paper", issued on Aug. 9, 1994, and assigned to the corporate assignee of the present invention. Other types of encoding may be used in the present invention as long as identification and selection of links and their association with the "hypertext" (or active regions) in the text are possible.

In one embodiment, the encoded information may be encrypted using one of the well-known encryption techniques, such as public/private key, RSA, etc.

The encoded machine-readable information 101 may be located anywhere on the document where human-readable information is not obscured (This location is referred to as a side channel). In one embodiment, the encoded information 101 is located at the left-handed side of each page. Note that in this case, it is the responsibility of the recognition hardware and/or software in a computer system to locate and identify the machine readable information in order to obtain the hyperlink information contained therein.

As shown in FIG. 1, the encoded information is contained in a boxed region. The encoded information 101 may be contained in one or more (e.g., 2, 3, 4, etc.) boxes.

The information contained in the encoded information 101 is associated with key words and figures and their hyperlinks. In one embodiment, the encoded information 101 for text may identify the location of the key words in the text portion and its associated link information specifying the document (or portion thereof) that is to be retrieved upon selection of the active region. In one embodiment, the key word is actually included in the encoded information. In such case it would be the responsibility of the conversion system to locate that key word in the text, via search, to associate its hyperlink information. In another embodiment, the encoded information 101 may not contain the key word, but instead contain its location. Its location may be specified by the location of the start of a key word or may be in the form of a bounding box which identifies an area in the text portion containing the key word associated with a particular hyperlink. As for figures, the information for a particular figure may only need to encode the rough position of the figure, since a segmentation algorithm, as described later, will locate its true boundaries. Likewise, the code used for a particular word may not specify the precise (x,y) position of the target word. Instead, encoding merely the line number or the order of the key word may suffice while another algorithm is used to identify the correct word. Note, the key word may be located based on the manner in which it is highlighted (e.g., underlining, bold, different color, etc.) in the hardcopy document. In another embodiment, the encoded data might contain links (the actual path information) to audio or movie files, if not just text or graphics.

FIG. 2 illustrates the process of converting a hardcopy document, such as a plain text document, to an electronic document such as a hypertext document. The process of plain text to hypertext document conversion begins by scanning a document having one or more pages (processing block 201). In one embodiment, each of the pages may resemble the page shown in FIG. 1. A scanner may be used to perform the function with the resulting output being, for example, a bit map image.

The bit map image is segmented to separate and locate features such as figures, paragraphs, lines, words, letters, and tables from the encoded information (processing block 202). In one embodiment, the segmentation algorithm may divide the bit map image based on knowledge of where the encoded information is on the page. For instance, a segmentation algorithm may assume that the encoded information is always located on the left side of each page at a specific location.

In one embodiment, the sidechannel information is stored in a box or rectangular shaped area wherein the border may be a certain number of pixels thick. In such a case, the segmentation algorithm performs a search for a border by scanning a row until a predetermined number of black pixels are found in a row. In one embodiment, a border may be three pixels thick. Once the box has been located, the information contained therein may be decoded. This decoding may be performed in a manner similar to that described in U.S. Pat. No. 5,337,362, entitled "Method and Apparatus for Placing Data Onto Plain Paper", issued Aug. 9, 1994, and assigned to the corporate assignee of the present invention.

Once the location of the encoded link information has been identified, the machine readable information is recognized and decoded to determine the hypertext link information contained therein (processing block 203).

Next, the "highlighted" regions (i.e., regions designated to be active) are identified (processing block 204). In one embodiment, the encoded information indicates the location of each active region. That is, active words or other elements may be identified by specific information setting forth the location and size (e.g., specifying a bounding box within which the word or object exists) in the machine readable information in the sidechannel. In an alternate embodiment, the identification of these active regions is made using one or more templates. The template may represent the form of highlighting used to set off the word or figure in the plain text. The template may be a bitmapped version of the highlighting. For instance, alternating black and white dashes may be used to underline each of the key words. In the present invention, an algorithm uses a bit mapped version of the alternating black and white dashes as a template to search the plain text until a strong correlation or perfect match occurs between the template and information in the text portion. If there is a correlation between the template and the area being checked that is above a specified threshold, then it is determined that hypertext link or word exists. The template(s) may be specified in the encoded sidechannel information or may be selected by the recognition algorithm. Note that the use of thresholds is well-known in the art. Further, the thresholds may be set by a system designer and/or user.

It should be noted that recognition of the digital information may be performed after identifying specific graphical features, paragraphs, lines, words, letters, tables in the text portion of the scanned hardcopy document.

Once the encoded information has been decoded and specific active regions in the plain text portion of the document identified, the hyperlink information is associated with the active words and/or objects (processing block 205), and processing is performed to create the hypertext document in a manner well-known in the art, such that the selection of one of the marked words causes that portion of the document or other documents to be retrieved based on a resource locator within the link information.

Note that when creating the hypertext document image to be displayable on screen, the active regions (e.g., the key words or objects) associated with hyperlink information may be highlighted in any manner. The manner of highlighting may be specified by the processing procedure creating the hypertext document. The highlighting may be underlining or placing the active portions of a document in a different font or color (e.g., bold). It should be noted that the highlighting selected for the newly created hypertext document does not have to be the same form of highlighting used to designate the active regions in the hardcopy version of the document.

FIG. 3 illustrates an overview of one embodiment of the document conversion system of the present invention shown in block diagram form. The system of the present invention is a digital processing system. It will be understood that while FIG. 3 is useful for providing an overall description of the processing system of the present invention, a number of details of the system are not shown. As necessary for disclosure of the present invention, further detail is set forth with other figures provided with this specification. Further, the present invention is described with reference to various embodiment; alternative embodiments which may be conceived by one of ordinary skill in the art are considered within the scope of the claims set forth below.

Referring to FIG. 3, the system of the present invention includes a bus or other communication means 301 for communicating information. Processor 302 is coupled with bus 301 for processing information. A random access memory (RAM) or other dynamic storage device 303 (commonly referred to as a main memory) for storing information and instructions for processor 302 is also coupled to bus 301. Also coupled to bus 302 is a read only memory (ROM) or other static storage device 304 for storing static information and instructions for processor 302 and a data storage device 305, such as a magnetic disk and disk drive for storing information and instructions.

The processing system also includes a scanner 306 coupled to bus 301 for scanning selected hardcopy versions of documents into the system. Scanner 306 is capable of reading digital representations of images (e.g., digital paper), as well as regular images.

In one embodiment, scanner 306 comprises a gray scale scanner. In one embodiment, the resolution of scanner 306 resolution is 200 DPI. Scanner 306 converts the individual picture elements, referred to as pixels, of the scanned image into digital values. In one embodiment, scanner 306 comprises an Image Scanner ICS-400 brand scanner of Ricoh Corporation of West Caldwell, N.J. In other embodiments, scanner 306 is a bit map scanner which scans the image of each hardcopy input document in a predetermined spatial resolution to produce digital values. These digital values collectively produce a data structure known as a bit map image, which is well-known to those in the art.

Note that in one embodiment, processor 302 runs one or more software routines to perform the segmentation, decoding and electronic document creation processes for a document conversion system using the input from scanner 306. Thus, in one embodiment, processor 302 operates as the encoder and the decoder of the present invention. The software may be stored and accessed from a memory in the system. Note also that processor 302 may also perform encryption and decryption if employed in the document conversion process.

The computer system may include separate decoder hardware and encoder hardware distinct from processor 302.

A hardcopy device 307 is also coupled to bus 301 for printing hard copy versions of documents that were converted from electronic formats. In one embodiment, hardcopy device 307 could comprise a plotter or printer, such as a bit map printer that maps the digital values of a bit map image into pixels which are printed on plain paper, film, or other similar media.

Moreover, a human or user interface 308 is included for enabling a user to interact with processor 302, scanner 306 and hardcopy device 307. User interface 308 represents the input and output devices through which the user enters control instructions to and receives feedback from the photocopier (i.e., processor 302, scanner 306 and hardcopy device 307).

User interface 308 could include an alphanumeric input device including alphanumeric and other keys for communicating information and command selections, a cursor control device for controlling cursor movement and/or a display device, such as a cathode ray tube (CRT), liquid crystal display, etc. for displaying information to the photocopier user. Note that these components are well-known in the art and have been omitted to avoid unnecessarily obscuring the present invention. Note that in one embodiment, user interface 308 may provide inputs directly to scanner 306 and hardcopy device 307 which can be distinct from those inputs to processor 302.

Note that these components may be integrated together into a single system or separately accessible components, such as a scanner 306 and hardcopy device 307. In one embodiment, scanner 306 and/or hardcopy device 307 could be coupled to bus 301 using dedicated communication links or switchable communication networks.

In one embodiment, the processor 302, in conjunction with the rest of the computer system, runs conversion software that performs the following functions. First, the conversion software decodes the machine readable information that is encoded in the sidechannel to obtain link information to associate the links with highlighted, or active, words or objects in the text portion. Second, the conversion software recognizes words or active regions in the text portion. This further could be performed using location information specified in the machine readable information (encoded portion) of the bit map image of the plain paper document or using a template specified in the decoded machine readable information or defined in storage and always used by the conversion software. Third, the conversion software translates the link information and the recognized highlighted regions into a hypertext document. Note that the performance of each of these conversion step is well-known to those skilled in the art.

In one embodiment, the computer system is coupled via channel or other data transfer mechanism to a Web site in the World Wide Web (WWW). Such a connection is illustrated in FIG. 4. In one embodiment, the computer system may comprise the Web site and the Web site is coupled to the Internet or other network or document resource which provides access to the WWW.

Once a hypertext document has been created, it may be published for use on the WWW with the Internet, such that selection of active regions (hyperwords) on an electronic version of the document being displayed causes the retrieval of other documents or portions of the document that may be located by using the universal resource locator or other resource identifier.

It should be noted that the present invention is not limited to retrieving and publishing documents on the WWW or the Internet. The teachings of the present invention may be applied to various networks, data document storage and archival facilities, or other types of client/service systems which have documents or other information available upon request.

The present invention includes a process by which a hypertext document is converted into a plain paper document. One embodiment of this process is shown in FIG. 5. The hardcopy document that results contains hypertext link information in machine readable format to enable conversion back into a hypertext document format. Thus, the link information will be available to the user to enable a reversal back into a hypertext document.

Referring to FIG. 5, the conversion process begins by creating a bit map of a hyperpage that is currently displayed on the display screen from a screen "dump" (processing block 501). An example of such a document in shown in FIG. 6A. A portion of the bit map is shown in FIG. 6B.

Once a bit map has been created, the present invention detects the hyperwords in the bit map (processing block 502). In one embodiment, the hyperwords are detected by using a template. Such a template is shown in FIG. 6D. The present invention searches the bit map locating portions of the bit map with the template, generating correlation values.

FIG. 6E illustrates correlation values around the boxed region shown in FIG. 6C. The correlation value indicate whether there is a high correlation between portions of the document and the template.

Once the marked words have been identified, the location and hyperlink information is encoded (processing block 503), the information is formatted into one or more pages (processing block 504), and a hardcopy document is printed having a sidechannel with encoded hyperlink information (processing block 505). In one embodiment, a template may be encoded as well for use in locating active regions.

Whereas, many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the various embodiments are not intended to limit the scope of the claims which themselves recite only those features regarded as essential to the invention.

Thus, a method and apparatus for converting between hardcopy versions and electronic versions of documents has been described.

We claim:

1. A method of converting a hardcopy document to an electronic document comprising the steps of:

scanning a hardcopy document containing encoded link information and one or more regions designated to be active associated with said encoded link information;

decoding the encoded link information to obtain the link information associated with said one or more regions;

locating said one or more regions in a scanned-in version of the hardcopy document, wherein the step of locating comprises searching a bit map of the scanned hardcopy document using a template stored in the encoded link information and obtained when decoding the encoded link information; and creating an electronic version of the hardcopy document having said one or more regions linked to electronic information, such that selection of any of said one or more regions accesses linked electronic information.

2. The method defined in claim 1 wherein the encoded link information identifies a location of at least one of said one or more regions in the document.

3. The method defined in claim 1 wherein the encoded link information includes location information identifying a location of said at least one of said one or more regions in the document.

4. A method of generating an electronic document comprising the steps of:

scanning a hardcopy document containing encoded link information and one or more regions designated to be active associated with said encoded link information; and converting scanned information to an electronic version of the hardcopy document having active regions, wherein the step of converting comprises decoding the encoded link information, determining a location of each of said active regions, and linking each active region to electronic information via decoded link information, such that selection of an active region accesses linked electronic information, and wherein the encoded link information includes location information identifying a location of at least one of said active regions in the document, and further wherein the location information identifies at least one word located in a text portion of the hardcopy document associated with said at least one active region.

5. The method defined in claim 4 wherein the location information identifies a start of a word associated with said at least one active region.

6. The method defined in claim 4 wherein the scanned information is converted a hypertext version of the paper document having hypertext links one word located in a text portion of the hardcopy document associated with.

7. The method defined in claim 6 wherein the location information identifies a start of a word associated with said at least one active region.

8. A method of generating an electronic document comprising the steps of:

scanning a hardcopy document containing encoded link information and one or more regions designated to be active associated with said encoded link information; and converting scanned information to an electronic version of the hardcopy document having active regions, wherein the step of converting comprises decoding the encoded link information, determining a location of each of said active regions, and linking each active region to electronic information via decoded link information, such that selection of an active region accesses linked electronic information, and wherein the encoded link information includes location information identifying a location of at least one of said active regions in the document, and further wherein the location information indicates a bounding box specifying an area containing said at least one active region.

9. The method defined in claim 8 wherein the scanned information is converted a hypertext version of the paper document having hypertext links.

10. A method of generating an electronic document comprising the steps of:

scanning a hardcopy document containing encoded link information and one or more regions designated to be active associated with said encoded link information; and converting scanned information to an electronic version of the hardcopy document having active regions, wherein the step of converting comprises decoding the encoded link information, determining a location of each of said active regions, and linking each active region to electronic information via decoded link information, such that selection of an active region accesses linked wherein the encoded link information includes location information identifying a location of at least one of said active regions in the document, and further wherein the location information indicates a line number and order location associated with said at least one active region.

11. The method defined in claim 8 wherein the scanned information is converted a hypertext version of the paper document having hypertext links.

12. A method of generating an electronic document comprising the steps of:

scanning a hardcopy document containing encoded link information and one or more regions designated to be active associated with said encoded link information; and converting scanned information to an electronic version of the hardcopy document having active regions, wherein the step of converting comprises decoding the encoded link information, determining a location of each of said active regions, and linking each active region to electronic information via decoded link information, such that selection of an active region accesses linked electronic information, and wherein the encoded link information sets forth at least one of said active regions located in the document and the manner in which said at least one active region is highlighted.

13. The method defined in claim 12 wherein the encoded link information identifies a location of said at least one of said active regions in the document.

14. The method defined in claim 12 wherein the encoded link information includes location information identifying a location of said at least one of said active regions in the document.

15. The method defined in claim 12 wherein the scanned information is converted a hypertext version of the paper document having hypertext links.

16. A method of generating an electronic document comprising the steps of:

scanning a hardcopy document containing encoded link information and one or more regions designated to be active associated with said encoded link information; and converting scanned information to an electronic version of the hardcopy document having active regions, wherein the step of converting comprises decoding the encoded link information, determining a location of each of said active regions, wherein the step of determining a location of each of said active regions comprises searching a bit map of the scanned hardcopy document using a template that is stored in the encoded link information and obtained when decoding the encoded link information, and linking each active region to electronic information via decoded link information, such that selection of an active region accesses linked electronic information.

17. The method defined in claim 16 wherein the scanned information is converted a hypertext version of the paper document having hypertext links.

18. A system for converting a hardcopy version of a document to an electronic version comprising:

a scanner to scan the hardcopy version of the document;

a decoder coupled to the scanner to decode encoded link information in scanned information from the scanner, wherein the encoded link information includes location information identifying a location of at least one active region in the document, and further wherein the location information identifies at least one word located in a text portion of the hardcopy document associated with said at least one active region; and processing logic coupled to the scanner and the decoder to identify and locate active regions designated to be linked to other electronic information indicated in the encoded link information and to create the electronic version in which selection of one of said active regions when said electronic version is displayed causes the linked information associated with said one of said active regions to be retrieved.

19. The apparatus defined in claim 18 wherein the location information identifies a start of a word associated with said at least one active region.

20. A system for converting a hardcopy version of a document to an electronic version comprising:

a scanner to scan the hardcopy version of the document;

a decoder coupled to the scanner to decode encoded link information in scanned information from the scanner, wherein the encoded link information includes location information identifying a location of at least one active region in the document, and further wherein the location information indicates a bounding box specifying an area containing said at least one active region; and processing logic coupled to the scanner and the decoder to identify and locate active regions designated to be linked to other electronic information indicated in the encoded link information and to create the electronic version in which selection of one of said active regions when said electronic version is displayed causes the linked information associated with said one of said active regions to be retrieved.

21. A system for converting a hardcopy version of a document to an electronic version comprising:

a scanner to scan the hardcopy version of the document;

a decoder coupled to the scanner to decode encoded link information in scanned information from the scanner, wherein the encoded link information includes location information identifying a location of at least one active region in the document, and further wherein the location information indicates a line number and order location associated with said at least one active region; and processing logic coupled to the scanner and the decoder to identify and locate active regions designated to be linked to other electronic information indicated in the encoded link information and to create the electronic version in which selection of one of said active regions when said electronic version is displayed causes the linked information associated with said one of said active regions to be retrieved.

22. A system for converting a hardcopy version of a document to an electronic version comprising:

a scanner to scan the hardcopy version of the document;

a decoder coupled to the scanner to decode encoded link information in scanned information from the scanner, wherein the encoded link information sets forth at least one of said active regions located in the document and the manner in which said at least one active region is highlighted; and processing logic coupled to the scanner and the decoder to identify and locate active regions designated to be linked to other electronic information indicated in the encoded link information and to create the electronic version in which selection of one of said active regions when said electronic version is displayed causes the linked information associated with said one of said active regions to be retrieved.

23. A system for converting a hardcopy version of a document to an electronic version comprising:

a scanner to scan the hardcopy version of the document;

a decoder coupled to the scanner to decode encoded link information in scanned information from the scanner; and processing logic coupled to the scanner and the decoder to identify and locate regions designated to be linked to other electronic information indicated in the encoded link information and to create the electronic version in which selection of one of said regions when said electronic version is displayed causes the linked information associated with said one of said regions to be retrieved, and wherein the processing logic searches a bit map of the scanned hardcopy document using a template that is stored in the encoded link information and obtained when decoding the encoded link information.

* * * * *